March 31, 1959  G. D. MOHR  2,879,741
GLUE SPREADER
Filed Aug. 13, 1956

INVENTOR.
George D. Mohr
BY Ramsey and Kolisch
Attys.

United States Patent Office 2,879,741
Patented Mar. 31, 1959

2,879,741

GLUE SPREADER

George D. Mohr, Eugene, Oreg., assignor to Clear Fir Products Co. Inc., Springfield, Oreg., a corporation of Oregon Application August 13, 1956, Serial No. 603,570

3 Claims. (Cl. 118—246)

This invention relates to apparatus for applying adhesive, and more particularly to apparatus for use in conjunction with flexible sheet material, such as flexible wood, veneers, and other wood products.

Modern technology has increasingly demonstrated the many advantages which may be obtained in the use of laminated materials. Such advantages include the fact that in many instances additional strength may be obtained and a more economic product is possible. This is well illustrated by the wood products industry, where it has been found that laminated structures are often considerably stronger than lumber in its unmanufactured state. The use of inferior types of lumber and wood waste material in the manufacture of laminated products has become increasingly prevalent with decreasing supplies of prime lumber.

In the usual method of manufacturing a laminated structure, such as plywood or a veneered board, one step comprises passing a thin sheet of the material employed as the lamina in the product through suitable apparatus which will apply a coat or film of adhesive to at least one of the surfaces of the sheet. The adhesive should be uniformly distributed over substantially the entire face of the sheet, to insure that in the finished product a strong and uniform bond exists between the sheet and the base to which it is fastened.

Although various types of apparatus have been proposed to accomplish the ends described above, to my knowledge none of them have been wholly satisfactory. One of the deficiencies encountered has been that the adhesive has not been properly distributed into the irregularities present on the surfaces of most sheets. Trouble has also been experienced in depositing the requisite amount of adhesive on the leading and tailing edges of a sheet as a sheet travels through the apparatus. These deficiencies in existing apparatus are considerably magnified where glue is being applied to particular flexible material such as thin wood veneers.

A well constructed adhesive applier, in addition to taking care of those problems, should permit a series of sheets to be fed easily through the apparatus without experiencing a delay when each new sheet enters the apparatus. The apparatus should also be readily disassembled so that it may be properly cleaned during periods of shut down.

Generally, it is an object of this invention to provide an adhesive applying apparatus which will take care of the above requirements in a highly practical and satisfactory manner.

More specifically, it is an object of this invention to provide apparatus of the type described wherein the sheet material being coated is stressed to some extent as it passes through the apparatus, and adhesive applied to the sheet while it is in this condition so that a uniform extensive coat of adhesive is produced.

Another object of this invention is to provide apparatus for applying adhesive to sheet material wherein the sheet is stressed by deforming the sheet against an applier roll having adhesive clinging to its periphery, the resilient characteristics inherent in the sheet causing it to press firmly down on the roll during the interval it passes over the roll; and to provide such apparatus wherein the sheet material is pulled against the applier roll as it leaves the roll insuring a maximum amount of contact of the sheet with the adhesive clinging to the roll.

Still another object of this invention is to provide a machine of the hereinbefore described character which is of relatively simple construction and which may be readily disassembled for cleaning purposes.

These and other objects are attained by the present invention, various novel features of which will become more fully apparent as the following description is read in conjunction with the accompanying drawings, wherein.

Figure 1:
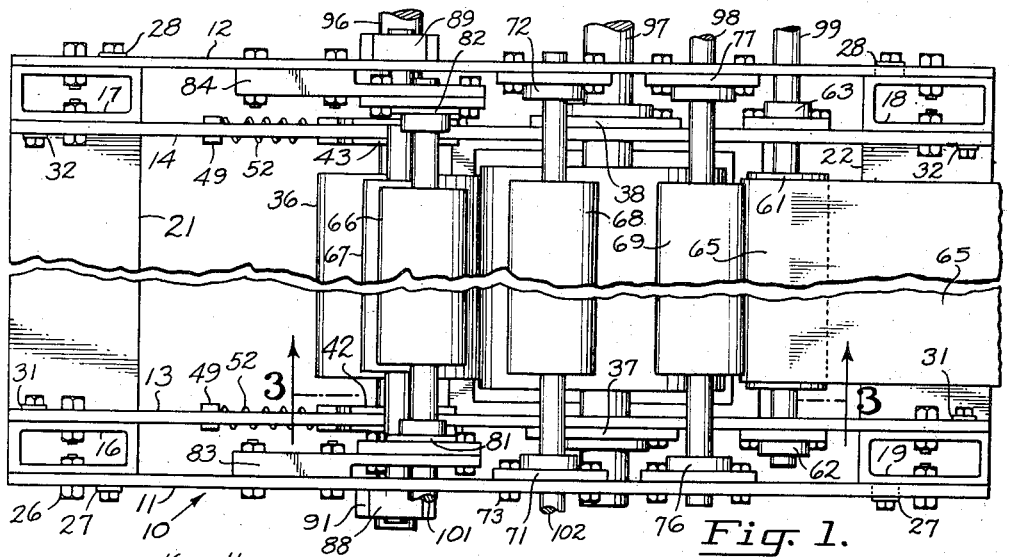
Fig. 1 is a top view partially broken away of an adhesive applying apparatus embodying this invention, showing the position of various rolls employed.
Figure 2:
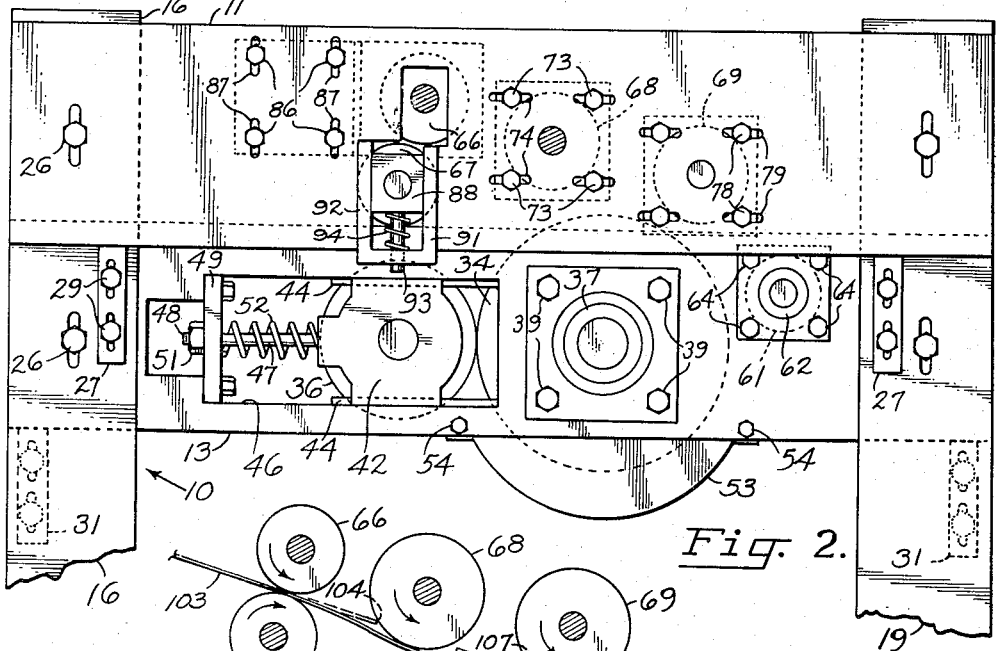
Fig. 2 is a side view of the apparatus illustrated in Fig. 1.

Referring to Figs. 1 and 2, the embodiment of applicant's apparatus illustrated comprises in general a frame or mounting means 10 which includes a pair of oppositely disposed horizontal upper frame sections 11 and 12, and a pair of oppositely disposed horizontal lower frame sections 13 and 14, fastened at their ends to upstanding frame members 16, 17, 18 and 19. Fastened to frame members 16 and 17 and extending therebetween are lateral truss members, illustrated by upper truss member 21, and similarly, fastened to frame members 18 and 19 and extending therebetween are additional lateral truss members, illustrated by upper truss member 22.

Lower frame sections 13 and 14 and upper frame sections 11 and 12 are each detachably affixed to the upstanding frame members as by fastening bolts 26. The lower and upper frame sections are also adjustable vertically on the frame members so that the assembly interposed between the upper frame sections and mounted therein may be adjustably positioned as a unit with respect to the assembly interposed between and mounted in the lower frame sections.

Clips 27 are fastened to the outer and side faces of frame members 16 and 19 beneath frame section 11, and clips 28 are fastened to the outer and side faces of frame members 17 and 18 beneath frame section 12, these clips being adjustably secured to the frame members as by bolts 29, and when fixed in any given position serve as a vertical positioning means for upper frame sections 11 and 12. Similarly, adjustable clips 31 and 32 serve as a vertical positioning means for lower frame sections 13 and 14, respectively.

Interposed between the lower frame sections 13 and 14, and suitably mounted therein are a pair of parallel rolls, adhesive applier roll 34, and doctor or spreading roll 36. Applier roll 34 is rotatably mounted at opposite ends in bearing assemblies 37 and 38 secured to frame sections 13 and 14 as by bolts 39. Doctor roll 36 is rotatably mounted at opposite ends in takeup bearing assemblies 42 and 43. Each takeup bearing assembly is slidably mounted for horizontal movement in the lower frame sections by means of a set of runners 44 secured to the inner edges of a cut out portion 46 made in each lower frame section.

Doctor roll 36 is slidably mounted on runners 44 for movement to the right and left as viewed in Figs. 1 and 2 determined by the setting of a stud bolt 47, slidably mounted for limited reciprocation between protracted and extended positions in each bearing assembly 42, 43. The outer end of each stud bolt 47 is threaded as at 48, and the threaded end 48 extends through a bar segment 49 fastened to the inner edges of cutout 46. A nut 51 is screwed about the threaded end 48, tightening of nut 51 serving to draw stud bolt 47 to the left in Fig. 2. A compression spring 52 encircles stud bolt 47 with opposite ends seated on bar segment 49 and the bearing assembly, respectively. To adjust each bearing assembly, nut 51 is tightened on stud bolt 47 moving the stud bolt to its maximum extended position with respect to the bearing assembly. Further tightening will back off the doctor roll 36 from applier roll 34. In operation, the doctor roll is set a certain distance from applier roll 34, the distance selected determining the thickness of the adhesive coat clinging to the surface of applier roll after it passes the doctor roll.

An adhesive pot or reservoir 53 is fastened to the lower sides of lower frame sections 13, 14 as by bolts 54. Reservoir 53 extends between frame sections 13 and 14 in an underlying position with respect to applier roll 34 and with sides encompassing the lower surfaces of the applier roll. When reservoir 53 is filled with adhesive, rotation of the applier roll through the space bounded by the reservoir will cause a layer of adhesive to be deposited on the applier roll.

Extending between the lower frame sections 13 and 14 and parallel to applier roll 34, is an outfeed or conveyor roll 61. Roll 61 is rotatably mounted in bearing assemblies 62 and 63, secured to opposite frame sections by suitable means such as bolts 64. Wrapped on roll 64 is a conveyor belt 65 for transporting sheet material away from the apparatus.

Interposed between upper frame sections 11 and 12 and suitably mounted therein are a pair of pinch rolls 66 and 67, and a pair of hold-down rolls 68 and 69.

Hold-down roll 68 is rotatably mounted at opposite ends in bearing assemblies 71 and 72, secured to the upper frame sections for adjustable movement in a horizontal direction by bolts 73 inserted in horizontal slots 74. In a similar manner, hold-down roll 69 is rotatably mounted at opposite ends in bearing assemblies 76 and 77, secured to the upper frame sections for adjustable movement in a horizontal direction by bolts 78 inserted in horizontal slots 79.

Pinch roll 66 is rotatably mounted at opposite ends in bearing assemblies 81 and 82 secured by bolts to platform sections 83 and 84. Each platform section is secured to an upper frame section for adjustable movement in a vertical direction, as by bolts 86 and vertical slots 87.

Pinch roll 67 is rotatably mounted at opposite ends in bearing assemblies 88 and 89. As illustrated with reference to bearing assembly 88, each bearing assembly is mounted in an upper frame section for movement in a vertical direction. To this end, a U-shaped rail member 91 having upstanding rail sections 92 is fastened as by welding to the outer side of each upper frame member. A dependent stud 93 fastened to the lower portion of each bearing assembly has its lower end slidably inserted through the base of rail member 91. A compression spring 94 is seated between the bearing assembly and the base of the rail member, spring 94 exerting an upward thrust on the bearing assembly and urging the bearing assembly to an upper limit position determined by pinch roll 67 striking pinch roll 66.

Figure 3:
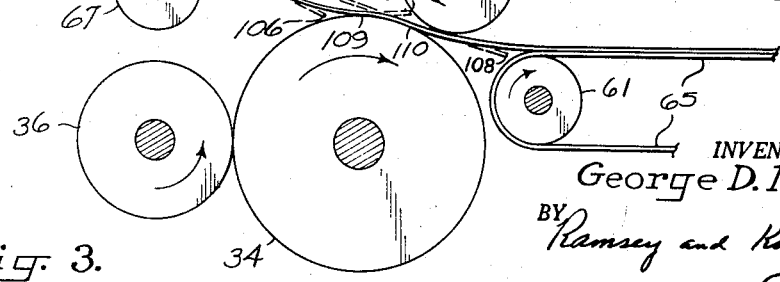
Fig. 3 is a sectional view, along the line 3—3 of Fig. 1, a sheet passing through the apparatus and the direction of rotation of various parts in the apparatus.

In operation, when sheet material is passed through the apparatus from left to right, applier roll 34, hold-down rolls 68 and 69, pinch rolls 66 and 67, outfeed roll 61, and doctor roll 36 rotate generally in the directions shown in Fig. 3. That is, lower pinch roll 67, applier roll 34, and outfeed roll 61, which rotate adjacent the lower surface of the sheet, rotate in a clockwise direction, whereas upper pinch roll 66, and hold-down rolls 68 and 69 rotate in a counterclockwise direction, these rolls contacting the upper surface of the sheet being treated. Doctor roll 36 usually rotates so that the periphery of the roll adjacent the applier roll moves in the direction of the applier roll.

Since considerable resistance is usually met by the applier roll as its periphery passes through reservoir 53 and the adhesive deposited therein, suitable driving means are provided for rotating the roll at the desired speed. In addition, it has been found desirable to drive the hold-down rolls and/or at least one of the pinch rolls, since this greatly expedites the feeding of the leading edges of new sheets through the apparatus. It has also been found that if a slight shearing stress is applied to the adhesive clinging to the applier roll as it passes against the doctor roll, a better regulated film of adhesive remains on the applier roll. Such a shearing force may be created by driving doctor roll 36 at a speed differing from that of applier roll 34.

Referring to Fig. 1, shaft extensions 96, 97, 98, and 99 of doctor roll 36, applier roll 34, hold-down roll 69, and out feed roll 61 respectively, project outwardly from frame members 12 and 14 to one side of frame 10. Drive means (not shown) are provided to rotate these shaft extensions so that the rolls corresponding to the shafts rotate in the direction shown in Fig. 3. Shaft extensions 101 and 102, of pinch roll and hold-down roll 68, respectively, project outwardly from frame members 11 and 13 to one side of frame 10, and drive means (not shown) are provided to rotate these shaft extensions so that their corresponding rolls rotate as indicated in Fig. 3.

As can best be seen in Fig. 3, the radial displacement of the various rolls with respect to applier roll 34 is such that a positive contact is effected between the surface of the sheet passing through the apparatus and the surface of the applier roll. This positive contact between the two surfaces is brought about by positioning the rolls so that the sheet passing through the apparatus is resiliently deformed while passing from hold-down roll 68 to the applier roll 34, and while passing from the applier roll 34 to hold-down roll 69. The stress created by the deformation of the sheet causes portions of the sheet to press firmly down on the applier roll. The various rolls should also be so positioned that new sheets may be readily fed into the apparatus.

Thus sheet material 103 passing through the apparatus enters the apparatus through pinch rolls 66 and 67, which preferably are spaced from hold-down roll 68 and angularly placed with respect to each other so that the leading edge of any sheet passing through the apparatus strikes hold-down roll 68 as at point 104. Point 104 should be low enough on hold-down roll 68 to permit the sheet material to progress downwardly therefrom. Hold-down roll 68 is positioned over applier roll 34 so that the leading edge of sheet 103 strikes the applier roll at a point 106, and thence is deflected over the upper surface of the applier roll. The second hold-down roll is positioned beside the applier roll so that upon leaving the applier roll the leading edge of the sheet strikes hold-down roll 69 at a point 107, and thence is deflected downwardly toward outfeed roll 61 striking belt 65 mounted on the roll at a point 108. The material is then deflected by outfeed roll 61 and belt 65 and passed out of the apparatus.

When a sheet of material is passing continuously through the apparatus, the material will be deformed generally as indicated by the solid lines in Fig. 3. By mounting the hold-down rolls so that a common tangential plane of the rolls intercepts the periphery of the applier roll, and by providing infeed and outfeed means for deflecting sheet material against the hold-down rolls, intimate contact of the sheet with the applier roll is provided, as at points 109 and 110. Referring to Fig. 3, pinch rolls 66, 67, which comprise the infeed means, deflect material against hold-down rolls 68 so that material bends around the roll in passing to the applier roll 34. Further, roll 61 deflects material against hold-down roll 69 so that material bends around roll 69 in passing outwardly from applier roll 34 past roll 69. Hold-down roll 68 is radially spaced from applier roll 34 so that material is stressed while passing between these two rolls, and pressure is exerted by the sheet at point 109. In a somewhat similar manner, hold-down roll 69 is spaced from applier roll 34 so that material is stressed passing between point 110 and the hold-down roll 69 and pressure is exerted by the sheet at point 110. The face of the sheet next to the applier roll curves convexly on approaching the applier roll, curves concavely around a portion of the applier roll, and then curves convexly on leaving the applier roll. Two spaced lines of contact, at 109, 110, respectively, are produced when the sheet approaches and leaves the applier roll. The radius of curvature imparted to sheet material passing between rolls 68, 69 should be sufficient to create the desired pressure, yet not so great as to rupture the sheet material passing therethrough.

To further insure adequate contact of the sheet material with the applier roll as it passes over the applier roll, the peripheral speed of hold-down roll 69 is preferably selected to be slightly faster than the peripheral speed of the applier roll. In this way sheet material tends to be pulled downwardly over the applier roll as it passes through the apparatus. Preferably outfeed roll 61 and belt 65 should rotate at a peripheral speed which is substantially the same as the peripheral speed of the applier roll, to counteract any acceleration effect which may arise from the faster peripheral speed of hold-down roll 69.

By way of example, in the treating of wood veneers ranging from about 1/10 to 1/40 of an inch in thickness, good results were obtained when the radius of curvature of the material passing through the machine ranged from about 1½ inches to 24 inches with optimum results usually being obtained when the radius of curvature approximated six inches. A radius of curvature approximating this figure may be obtained in the usual case by employing an applier roll of about eight inch diameter and hold-down rolls of about four inch diameter, and radially spacing the hold-down rolls so that there is approximately ½ inch clearance between their periphery and the applier roll, and so that the centers of the hold-down rolls are angularly displaced about the center of the applier roll at approximately a 45° angle. Pinch rolls 66 and 67 and outfeed roll 61 should then be adjusted so that the material is properly deflected against the hold-down rolls.

In the handling of wood veneer as described above, the peripheral speeds of the rolls, of course, may be varied within wide ranges depending upon the strength of the material handled. However, as also indicated, it is preferable that the peripheral speed of hold-down roll 69 slightly exceed the peripheral speed of the applier roll. With the pinch rolls, the first hold-down roll, and the applier roll rotating at a peripheral speed of about 80 feet per minute, excellent results were obtained using a peripheral speed of about twice this, or approximately 160 feet per minute, for hold-down roll 69.

It has also been found that if a shearing force is applied to the adhesive clinging to the applier roll as it leaves the adhesive reservoir, a more uniform distribution of adhesive may be obtained. In the example given, such results were obtained by rotating doctor roll 36 at a peripheral speed of slightly less than 80 feet per minute, approximating, for example, 70 feet per minute.

As may be seen from the foregoing, a novel arrangement has been provided wherein assured surface contact is achieved between the sheet material and the applier roll. Pinch rolls 66 and 67 comprise an infeed means deflecting material against the first hold-down roll, this hold-down roll in turn cooperating with applier roll to resiliently deform the material passing through the apparatus so that pressure is applied against the applier roll. Likewise, outfeed roll 61 and the second applier roll 69 cooperate to resiliently deform material passing through the apparatus so that additional pressure is applied against the applier roll. The leading and tailing edges of any sheet passing through the machine are assured of intimate glue contact by reason of the flexing of the sheet and the two pressure areas which have been created. Also, it should be observed that means have been provided, comprising hold-down roll 69, which tend to pull and tighten the material over the applier roll as it passes thereover.

Still further, by mounting the hold-down rolls 68 and 69 on different frame sections from those supporting the applier roll, the hold-down rolls may be removed from above the applier roll as a unit without disturbing the adjusted position of these rolls with respect to the applier roll. This is particularly desirable since the nature of adhesive is such that it should be adequately cleaned from the apparatus during any shutdown period.

While I have described only a single embodiment of the invention, it is desired not to be limited thereto and it is intended to cover all modifications thereof which should be apparent to one skilled in the art and that come within the scope of the appended claims.

I claim:

1. Apparatus for applying adhesive to a face of a sheet of veneer comprising an applier roll, a first hold down roll, a second hold down roll, the hold down rolls being positioned above the applier roll with their peripheries spaced from the periphery of the applier roll, a pair of infeed rolls for feeding a sheet of veneer face down towards the applier roll, said infeed rolls being positioned above the applier roll and to one side of the first hold down roll whereby a sheet of veneer is fed downwardly by the infeed rolls on a line tangent with the periphery of the applier roll, the periphery of the first hold down roll crossing said last mentioned line to flex the sheet downwardly and cause it to exert pressure against the periphery of the applier roll along a first line of contact, the second hold down roll engaging said sheet after it has been flexed against the applier roll and flexing the sheet downwardly to cause it to exert pressure against the periphery of the applier roll along a second line of contact.

2. Apparatus for applying adhesive to a face of a sheet of veneer comprising an applier roll, a first hold down roll positioned above the applier roll and parallel thereto, the periphery of said hold down roll being spaced from the periphery of the applier roll, a second hold down roll positioned above the applier roll and parallel thereto, the periphery of the second hold down roll being spaced from the periphery of the applier roll but closer thereto than the periphery of the first hold down roll, the axes of rotation of each of said hold down rolls lying on either side of the vertical plane of the axis of rotation of the applier roll, a pair of infeed rolls between which a sheet of veneer is fed face down, the axes of rotation of the infeed rolls being positioned above the axis of rotation of the applier roll, the common vertical plane of the axes of the infeed rolls being at an angle with the respective vertical planes of the applier roll and the hold down rolls whereby a sheet of veneer is fed downwardly by the infeed rolls on a line tangent with the periphery of the applier roll, the periphery of the first hold down roll crossing said last mentioned line to flex the sheet downwardly and cause it to exert pressure against the periphery of the applier roll along a first line of contact, the second hold down roll engaging said sheet after it has been flexed against the applier roll and flexing the sheet downwardly to cause it to exert pressure against the periphery of the applier roll along a second line of contact.

3. Apparatus according to claim 2 and an outfeed conveyor positioned below the periphery of the applier roll and cooperating with the second hold down roll to carry away veneer to one of whose faces adhesive has been applied.

References Cited in the file of this patent

UNITED STATES PATENTS

| | | |
|---|---|---|
| 1,981,321 | Murphy | Nov. 20, 1934 |
| 2,225,457 | Langsner | Dec. 17, 1940 |
| 2,227,494 | Gold | Jan. 7, 1941 |
| 2,461,388 | Minkow | Feb. 8, 1949 |
| 2,731,945 | Schaefer | Jan. 24, 1956 |